United States Patent
Hasegawa et al.

(10) Patent No.: US 6,859,461 B1
(45) Date of Patent: Feb. 22, 2005

(54) ORDERWIRE CONTROLLER

(75) Inventors: Kenichi Hasegawa, Yokohama (JP); Koichi Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 678 days.

(21) Appl. No.: 09/643,441

(22) Filed: Aug. 22, 2000

(30) Foreign Application Priority Data

Oct. 27, 1999 (JP) ............................................ 11-305027

(51) Int. Cl.⁷ .......................... H04L 12/56; H04L 12/28
(52) U.S. Cl. ...................... 370/424; 370/400; 370/404
(58) Field of Search ................................... 359/110, 135, 359/137; 370/404, 405, 406, 358, 376, 377, 228, 260, 261, 452, 266, 524, 222, 223, 224, 262, 263, 265, 270, 271, 267; 379/27.01, 32.01

(56) References Cited

U.S. PATENT DOCUMENTS

| | | | | |
|---|---|---|---|---|
| 4,449,247 A | * | 5/1984 | Waschka, Jr. .................. 455/9 |
| 4,621,357 A | * | 11/1986 | Naiman et al. ............. 370/370 |
| 5,402,414 A | * | 3/1995 | Asai ........................... 370/376 |
| 6,285,755 B1 | * | 9/2001 | Watanabe ................... 379/417 |
| 6,632,032 B1 | * | 10/2003 | Dombrowski et al. ........ 398/16 |

* cited by examiner

Primary Examiner—Hanh Nguyen
(74) Attorney, Agent, or Firm—Katten Muchin Zavis Rosenman

(57) ABSTRACT

An orderwire controller and orderwire control system which provide enhanced capabilities of flexible orderwire signaling to improve usability and maintainability. A network system involves multiple ring networks, each of which comprises a plurality of network elements interconnected in a ring topology. An orderwire controller, implemented in a network element, comprises a plurality of mixers and a combination controller. The mixers add up orderwire signals from local and remote sources. The combination controller controls how to associate the mixers with the rings, to provide flexible connections among the rings so that they can share their orderwire signals.

5 Claims, 14 Drawing Sheets

ORDERWIRE CONTROLLER

BACKGROUND OF THE INVENTION

1. Field of the Invention

The present invention relates to an orderwire controller and orderwire control system. More particularly, the present invention relates to an orderwire controller and system which control orderwire voice channels for use by maintenance people.

2. Description of the Related Art

Synchronous Digital Hierarchy (SDH) and Synchronous Optical Network (SONET) are standard specifications which provide core technologies to efficiently multiplex a wide variety of high-speed and low-speed services. In SDH/SONET systems, various control signals for operations and maintenance services are carried by a prescribed section of each transmission frame, called the "overhead." In particular, the overhead contains E1/E2 bytes for orderwire functions, with which maintenance people working at different network elements can talk to each other.

Normally, the orderwire communication is performed in broadcast mode, allowing one engineer to communicate with two or more other engineers simultaneously. In the case that the network is configured in a ring topology, the orderwire facilities offer ring protection functions to avoid howls, as well as providing ring restoration capabilities to recover from link failure. FIGS. 10 and 11 are diagrams explaining the concept of ring protection functions. More specifically, FIG. 10 shows a situation where orderwire signals propagate over a loop, and FIG. 11 shows how such a loop can be avoided by using ring protection functions.

Referring first to FIG. 10, four network elements (NEs) 101 to 104 are connected in a ring topology. Those NEs 101 to 104 are each equipped with a mixer A1 to A4, which is an analog adder to combine multiple voice signals in analog form. Telephone sets 101-1 to 104-1 are attached to those NEs 101 to 104, respectively, through a transformer (not shown). A digital voice orderwire signal carried on the E1/E2 bytes is converted into an analog voice signal when it has reached an NE. That analog voice signal is then mixed with similar signals sent from other NEs, and the NE sends the resultant signal to its local telephone set 101-1 to 104-1. Each NE also receives an analog voice signal from its local telephone set 101-1 to 104-1. This signal is mixed with similar voice signals sent from other NEs, converted into a digital voice signal, and sent out to the adjacent NEs on the E1/E2 bytes of SONET/SDH frames. In this way, all the telephone sets 101-1 to 104-1 coupled to the NEs 101 to 104 are interconnected by a common orderwire circuit.

With the above-described construct alone, however, the orderwire circuit would make a loop in each ring direction as indicated by the dotted lines in FIG. 10, where the outgoing signal transmitted from one telephone set comes back to itself after a certain propagation delay time. As a result, the speaker would hear the echo of his/her voice through the handset he/she is using, thus suffering an interference known as a howl.

To avoid the problem of howling noises, the NEs 101 to 104 are configured to operate under a mater-slave relationship in which the master station disconnects, or terminates, the orderwire circuit at its east or west side. FIG. 11 illustrates this master-slave configuration. In this example network, the NE 101 works as the master station, while other NEs 102 to 104 as slave stations. The master NE 101 terminates the orderwire circuit at its west ports, breaking the loop of orderwire signals. Now that the NEs 101 to 104 are interconnected in a linear fashion, the howling noise problem will never occur.

Referring next to FIGS. 12 and 13, the concept of ring restoration functions is depicted. More specifically, FIG. 12 shows a situation where a link failure occurs, and FIG. 13 shows how it is resolved by a ring restoration function.

In the system of FIG. 12, the NEs 101 to 104 form a ring network, the master NE 101 terminating its west-side orderwire circuit to avoid howling problems. Suppose here that a link failure occurs as indicated by the dotted circle in FIG. 12. Because of the presence of orderwire termination at the west side of the NE 101, the NEs 101 and 102 cannot communicate with the other NEs 103 and 104 any longer. In such a situation, a link failure would disrupt the delivery of orderwire signals to some member NEs in the ring, as long as the orderwire circuit is terminated at the master NE.

To correct this situation, it is necessary to reconfigure the ring network so that the termination of the orderwire circuit will be removed, and to make this operation possible, the master NE 101 should be notified of the link failure. Referring now to FIG. 13, the NE 103 detects a link communication error and reports it to the master NE 101 via the intermediate NE 104. The master NE 101 then connects the orderwire at its west side, and simultaneously, the NE 103 terminates the orderwire circuit at its west side. The orderwire connection is now recovered from disruption.

While, in the above-described ring system, one network element belongs only to a single ring, there are some other systems where one network element is connected to two or more ring networks. The network element of this type is referred to herein as the "junction node." FIG. 14 illustrates a system where two ring networks meet at a junction node, NE 100. The NE 100 provides junction functions to support the two rings, ring-a and ring-b. More specifically, the ring-a is formed by four NEs 101 to 103, and the ring-b is formed by four NEs 100 and 201 to 203, the two rings sharing the NE 100 as an intermediary node between them.

Conventionally, the junction node NE 100 provides only one mixer for orderwire signaling, as other normal NEs have. That mixer unit does not support mixing of orderwire signals supplied from a plurality of ring networks. For this reason, the NE 100 should choose either ring-a or ring-b to make orderwire functions operable in such a conventional system. This means that the NE 100 has to disconnect (or terminate) the non-chosen orderwire circuit at both the east and west ports. In the system of FIG. 14, the ring-a orderwire circuit is disconnected as such. This conventional setup of orderwire circuits does not allow the ring-a to form a complete ring network in terms of orderwire signaling, while normal communication data can be transported among the NEs 100 to 103 over the ring-a. (Note that the above termination only applies to orderwire signals, but it does not affect other normal traffic signals.) The ring-b, on the other hand, enables its members to communicate with each other over the orderwire channel, enjoying the benefits of a ring protection and ring restoration functions described earlier. In the illustrated system, the NE 201 serves as the master station of ring-b, the other NEs 100, 202, and 203 being slave stations. The master 201 terminates the orderwire circuit at its west port.

To see what problems are inherent in the above described multi-ring network system, consider the orderwire communication between the NEs 101 and 103 on the ring-a, in comparison with that between the NEs 100 and 203 on the ring-b. Since the orderwire circuit on the ring-b forms a fully functional ring, its ring restoration capabilities are expected to work effectively to save the network from a possible fault. For example, if it encounters a link failure at a portion Pb as shown in FIG. 14, the ring-b restores the orderwire communication through the steps of: (1) detecting the failure Pb at the NE 100, (2) sending a link failure alarm from the slave NE 100 to the master NE 201, and (3) moving the orderwire termination from the west side of the master NE 201 to the east side of the NE 100. In contrast to the ring-b, the ring-a has a problem in its orderwire circuit. More specifically, suppose that a link failure has occurred at a portion Pa shown in FIG. 14. In this case, the NEs 101 and 103 can no longer communicate with each other because their orderwire signals are blocked at the NE 100 in both the east-bound and west-bound directions.

As seen from the above discussion, the conventional junction function implemented in the NE 100 is insufficient in terms of its tolerance to link failures, since it cannot fully support the rings. In other words, the conventional orderwire system has to pose functional limitations on some of the rings. In case of a link failure, the orderwire communication on such rings would be inevitably disrupted, because of the lack of ring restoration functions.

Another problem in the conventional networks is that the NE 100 at the junction point lacks flexibility in the orderwire communication between different rings. The propagation of orderwire signals are confined within a single ring; there is no connectivity between the ring-a and ring-b. Thus, disadvantageously, the conventional networks fail to provide good usability or expandability of a system.

Still another problem in the conventional networks is that they cannot support orderwire communication between A-law systems (used in SDH networks) and Mu-law systems (used in SONET networks). When two ring networks use those different coding methods, they cannot communicate correctly because of the lack of appropriate conversion facilities.

SUMMARY OF THE INVENTION

Taking the above into consideration, an object of the present invention is to provide an orderwire controller with enhanced capabilities of orderwire signaling to provide improved usability and maintainability.

Another object of the present invention is to provide an orderwire control system with enhanced capabilities of orderwire signaling to provide improved usability and maintainability.

To accomplish the first object, according to the present invention, there is provided an orderwire controller which controls orderwire circuits to provide maintenance people with voice communication facilities. This controller comprises: a plurality of mixers which mix orderwire signals together; and a combination controller which controls the combinations of the orderwire signals to be mixed.

To accomplish the second object, according to the present invention, there is provided an orderwire control system which controls orderwire circuits to provide maintenance people with voice communication facilities. This system comprises: (a) a plurality of ring networks in which a plurality of nodes are interconnected in a ring topology; and (b) an orderwire controller comprising: a plurality of mixers which mix orderwire signals together, and a combination controller which controls the combinations of the orderwire signals to be mixed.

The above and other objects, features and advantages of the present invention will become apparent from the following description when taken in conjunction with the accompanying drawings which illustrate preferred embodiments of the present invention by way of example.

BRIEF DESCRIPTION OF-THE DRAWINGS

DESCRIPTION OF THE PREFERRED EMBODIMENTS

Preferred embodiments of the present invention will be described below with reference to the accompanying drawings.

Figure 1:
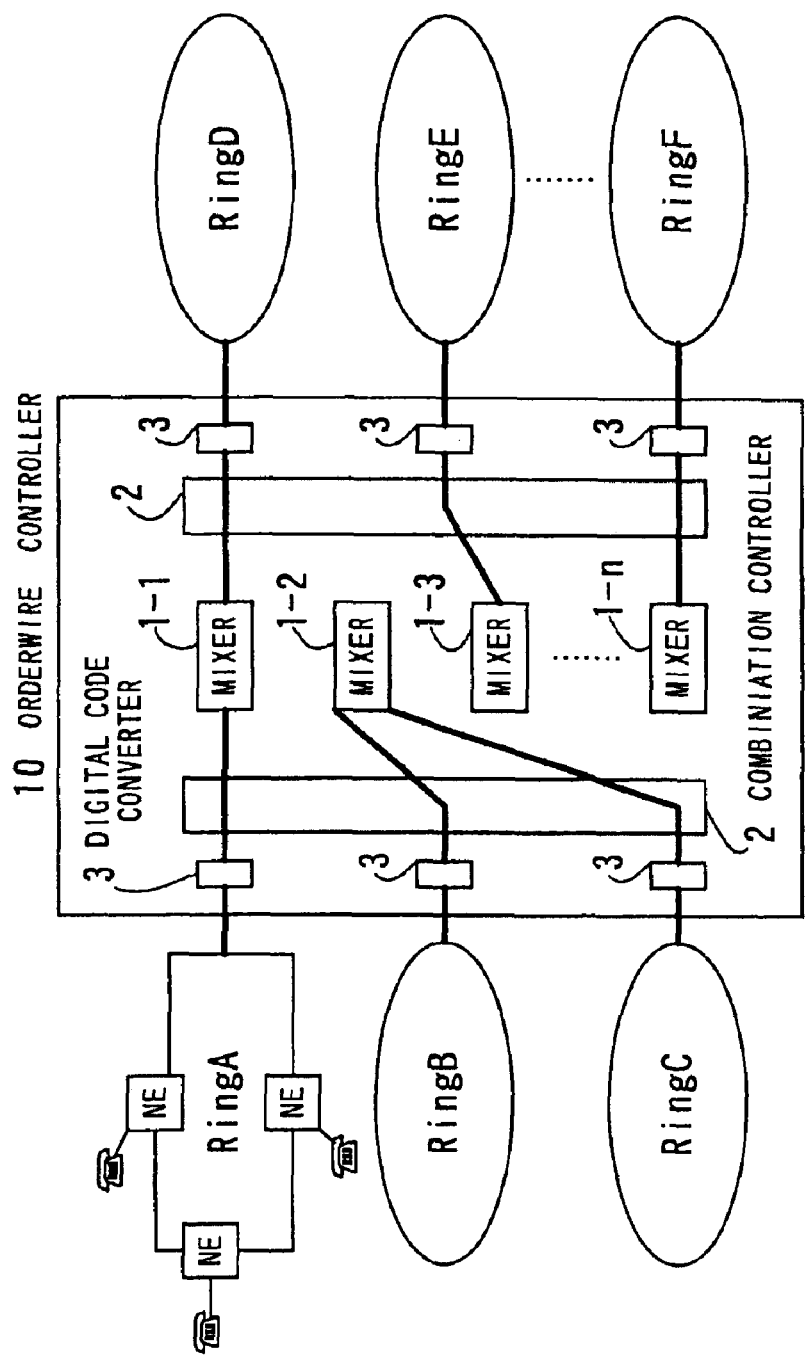
FIG. 1 is a conceptual view of an orderwire controller according to the present invention.

FIG. 1 is the conceptual view of an orderwire controller according to the present invention. This orderwire controller 10 is implemented in a network element (NE) to support voice communication between maintenance people over an orderwire circuit. The orderwire controller 10 comprises a plurality of mixers 11 to 1-$n$, combination controllers 2, and digital code converters 3. Each mixer 1-1 to 1-$n$ is designed to add up, in a digital fashion, the orderwire signals supplied from a plurality of ring networks to which the NE belongs. Those mixers 1-1 to 1-$n$ are coupled to appropriate ring networks through the combination controllers 2 and digital code converters 3 (described later). The ring networks may be SDH networks that transport signals in the form of Synchronous Transfer Module level four (STM-4), for example, but the invention should not be limited to any specific signal format.

In the illustrated system, there are a plurality of rings A to F, each of which comprises any number of member NEs. The NEs may each have a local telephone set to allow maintenance people to talk to each other, if necessary. While FIG. 1 depicts such specifics only for the ring A, the other rings also have similar structure. The mixers 1-1 to 1-$n$ are properly allocated, so that they serve the rings A to F in the following way:

Mixer 1-1 serves the rings A and D,

Mixer 1-2 serves the rings B and C,

Mixer 1-3 serves the ring E, and.

Mixer 1-*n* serves the ring F. The entire system comprising the proposed orderwire controller 10 and ring networks is referred to herein as the orderwire control system.

The combination controllers 2 comprise a matrix switch which provides flexible connections among the rings A to N and the mixers 1-1 to 1-*n*. That is, the combination controllers 2 can accept the orderwire signals from the rings A to F and direct them to any of the mixers 1-1 to 1-*n*, thereby providing a variety of mixing patterns as desired. With this mechanism, two or more rings can form a consolidated domain of orderwire communication. In the system of FIG. 1, the rings A and D share a single orderwire circuit, as do the rings B and C.

On the other hand, when a mixer is assigned to a single ring, the orderwire signal will be confined within that ring, meaning that a fully functional orderwire circuit can be formed. The rings E and F in the system of FIG. 1 are an example of this single ring arrangement. The most extreme case is when every ring needs an isolated orderwire circuit, in which case the orderwire controller 10 has to provide as many mixers as the number of rings.

The digital code converters 3 each convert an A law or Mu-law coded orderwire signal into a digital voice signal with unified quantizer step sizes. The resultant linear coded signals are supplied to the mixers 1-1 to 1-*n* through the combination controllers 2. Since the orderwire communication is bidirectional, the digital code converters 3 also convert a linear coded digital voice signal into either an A-law or Mu-law coded signal, depending the coding method used in a destination ring.

Figure 2:
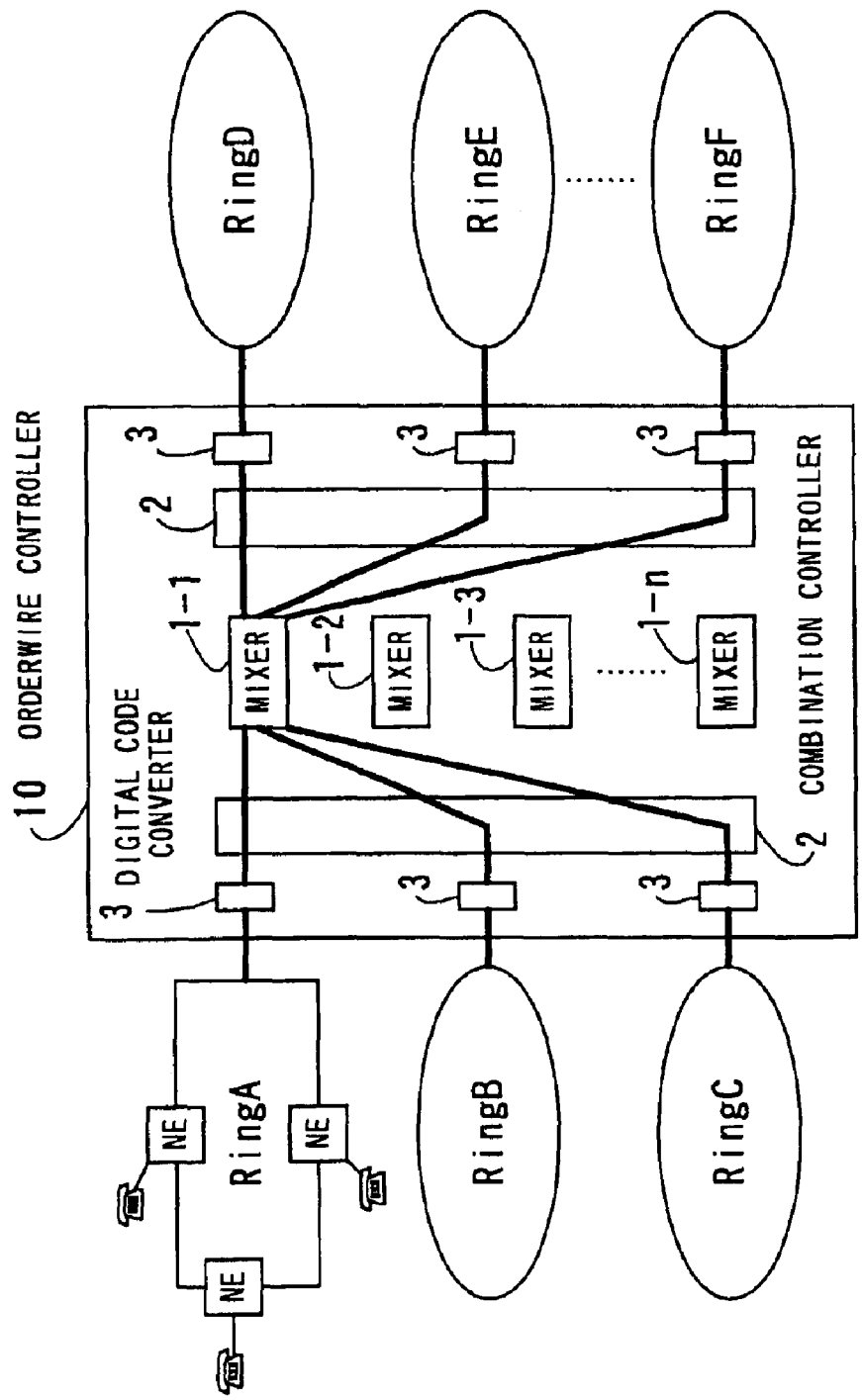
FIG. 2 is a diagram which shows a variation of combination control.

While FIG. 1 shows specific combinations of ring networks, the present invention is not restricted to those combinations. FIG. 2 shows a variation of the combination control, in which the combination controller 2 is programmed in such a way that all orderwire signals of the rings A to F will be concentrated to a single mixer 1-1. This arrangement permits all the NEs on the rings A to F to communicate with each other over a shared orderwire circuit.

Referring next to FIGS. 3 to 6, the following section will present a more specific system where the proposed orderwire controller 10 is placed at the Junction point of two ring networks. What has been described above as the combination controller 2 is now called a "matrix switch."

Figure 3:
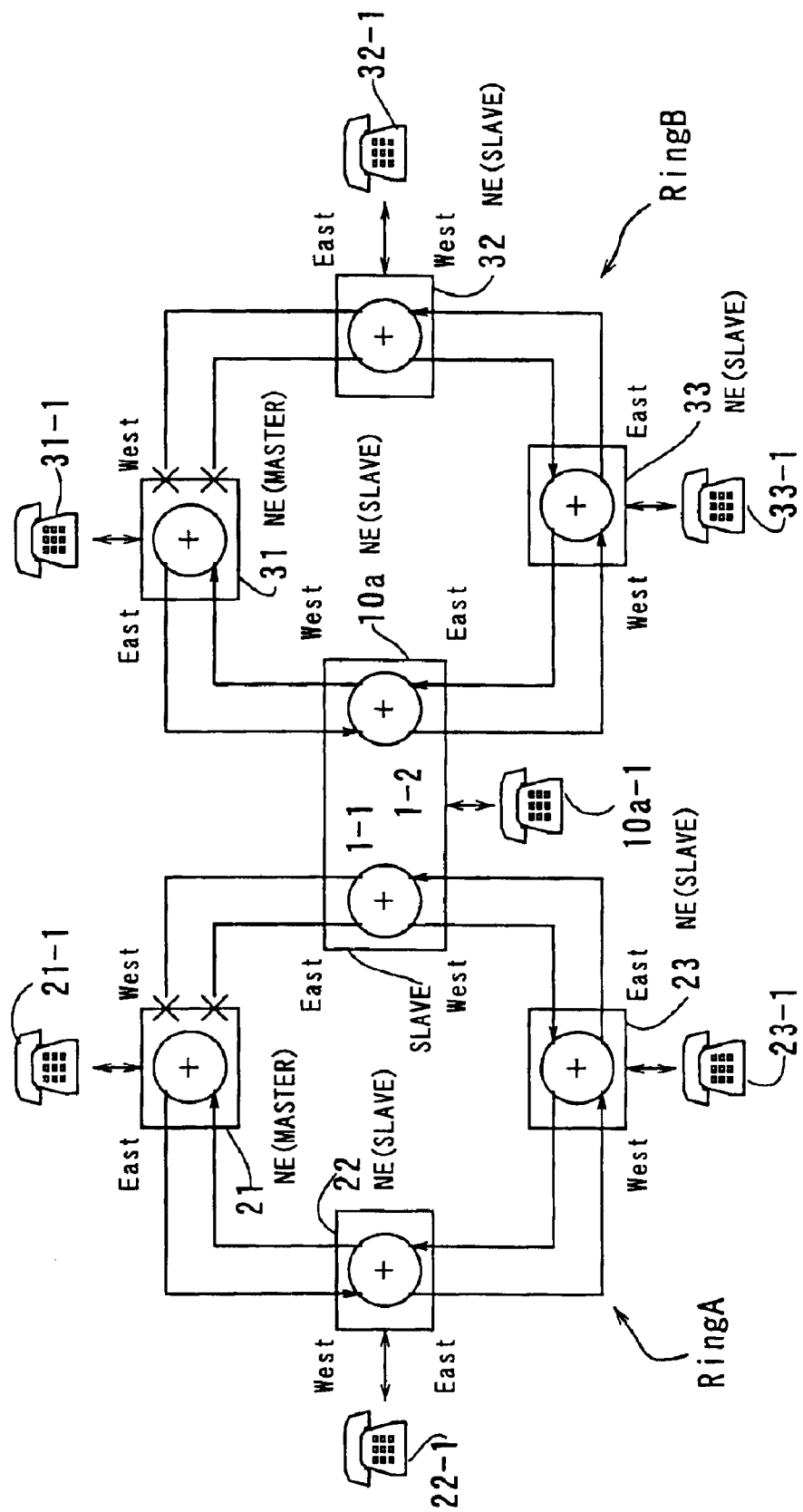
FIG. 3 is a diagram which shows a two-ring network system according to the present invention.

FIG. 3 shows a two-ring system according to the present invention. Although it is not explicitly shown in FIG. 3, the proposed orderwire controller 10 is implemented in a network element 10*a* which provides junction functions. The illustrated system comprises two rings, A and B. More specifically, the ring A is formed by four NEs 10*a*, 21, 22, and 23, and the ring B is formed by four NEs boa, 31, 32, and 33. The two rings share the NE 10*a* as the junction node located therebetween. All those NEs are equipped with a local telephone set for maintenance purposes. The proposed orderwire controller 10 in the NE 10*a* can be configured as a master or slave station independently for each ring. Specifically, in the illustrated system of FIG. 3, the NE 10*a* serves as a slave station at both sides, A and B.

Each NE 21 to 23 on the ring A has a mixer for combining orderwire signals, as do the NEs 31 to 33 on the ring B. The NE 10*a* has two mixers 1-1 and 1-2 to support the rings A and B, respectively. Accordingly, both rings A and B have a fully functional orderwire circuit with ring protection and restoration functions. The NE 21 serves as the mater station on the ring A, as does the NE 31 on the ring B. Both master NEs 21 and 31 are configured to terminate their respective orderwire circuits at their west port.

Figure 4:
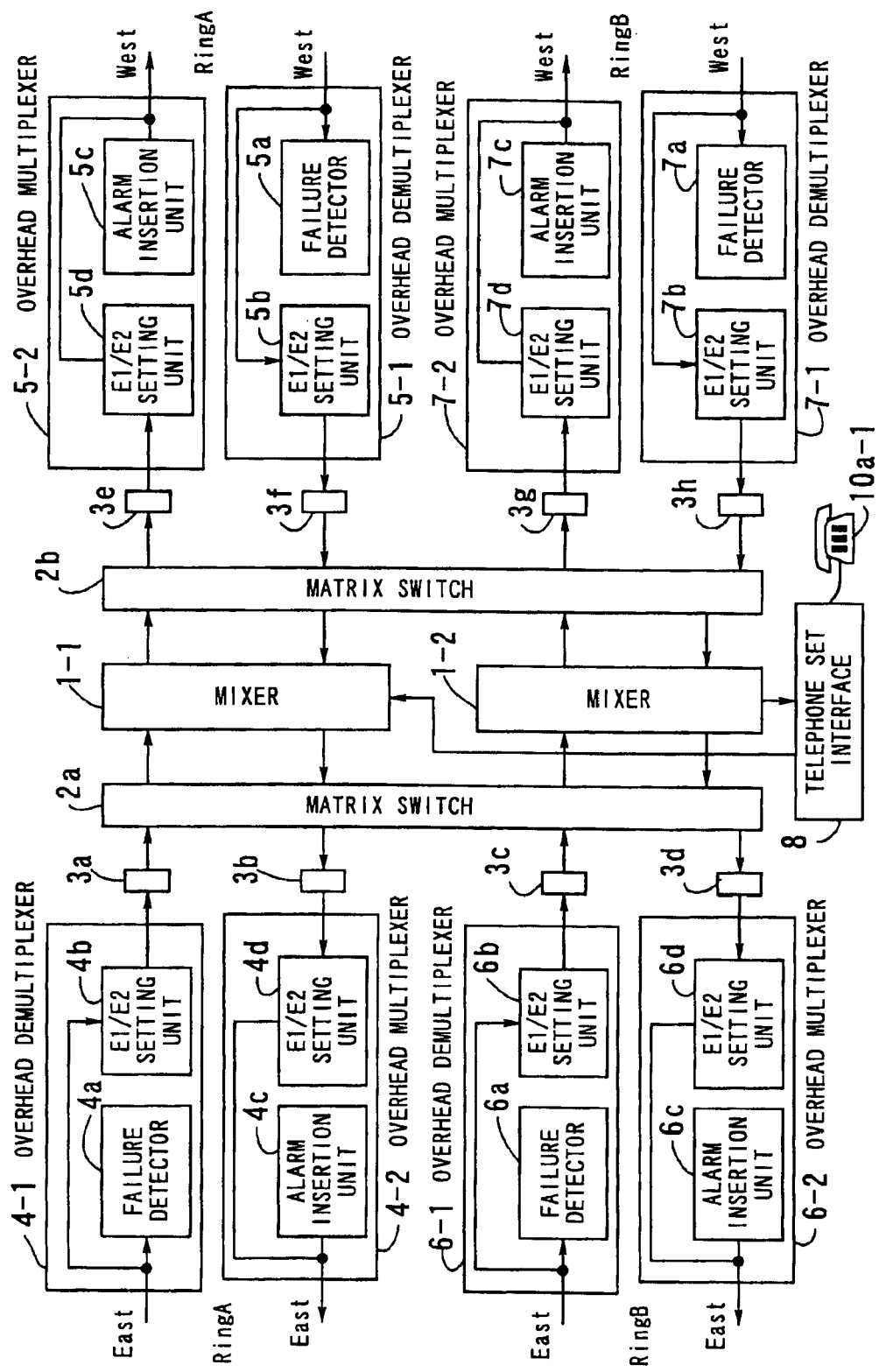
FIG. 4 is a diagram which shows the structure of a network element.

FIG. 4 shows the internal structure of the NE 10*a*. Overhead demultiplexers 4-1 to 7-1 terminate the overhead of incoming SDH/SONET frames. To this end, the overhead demultiplexers 4-1 to 7-1 comprise failure detectors 4*a* to 7*a* and E1/E2 setting units 4*b* to 7*b*, respectively. The failure detectors 4*a* to 7*a* detect link failure. The E1/E2 setting units 4*b* to 7*b* determine which to use E1 byte or E2 byte for orderwire signaling, and whether to enable or disable the orderwire function itself.

Overhead multiplexers 4-2 to 7-2 insert overhead information to each SDH/SONET frame to be transmitted. To this end, the overhead multiplexers 4-2 to 7-2 comprise alarm insertion units 4*c* to 7*c* and E1/E2 setting units 4*d* to 7*d*, respectively. The alarm insertion units 4*c* to 7*c* insert a link failure alarm when a link failure is detected. The E1/E2 setting units 4*d* to 7*d* determine which to use E1 byte or E2 byte for orderwire signaling, and whether to enable or disable the orderwire function itself.

Digital code converters 3*a*, 3*c*, 3*f*, and 3*h* receives orderwire signals from the overhead demultiplexers 4-1 to 7-1 and convert them into linear coded digital voice signals with unified quantizer step sizes. The resultant signals are supplied to matrix switches 2*a* and 2*b*, which feed the signals to the mixers 1-1 and 1-2, appropriately controlling the cross-connections between their inputs and outputs. The matrix switches 2*a* and 2*b* also accept digital voice signals from the mixers 1-1 and 1-2 and redirect them to digital code converters 3*b*, 3*d*, 3*e*, and 3*g*. Those digital code converters 3*b*, 3*d*, 3*e*, and 3*g* each convert a given linear coded signal into an A-law or Mu-law coded orderwire signal. The resultant signals are supplied to their associated overhead multiplexers 4-2 to 7-2. A telephone set interface 8, coupled to the mixers 1-1 and 1-2, controls connection to an external telephone set 10*a*–*l*.

Figure 5:
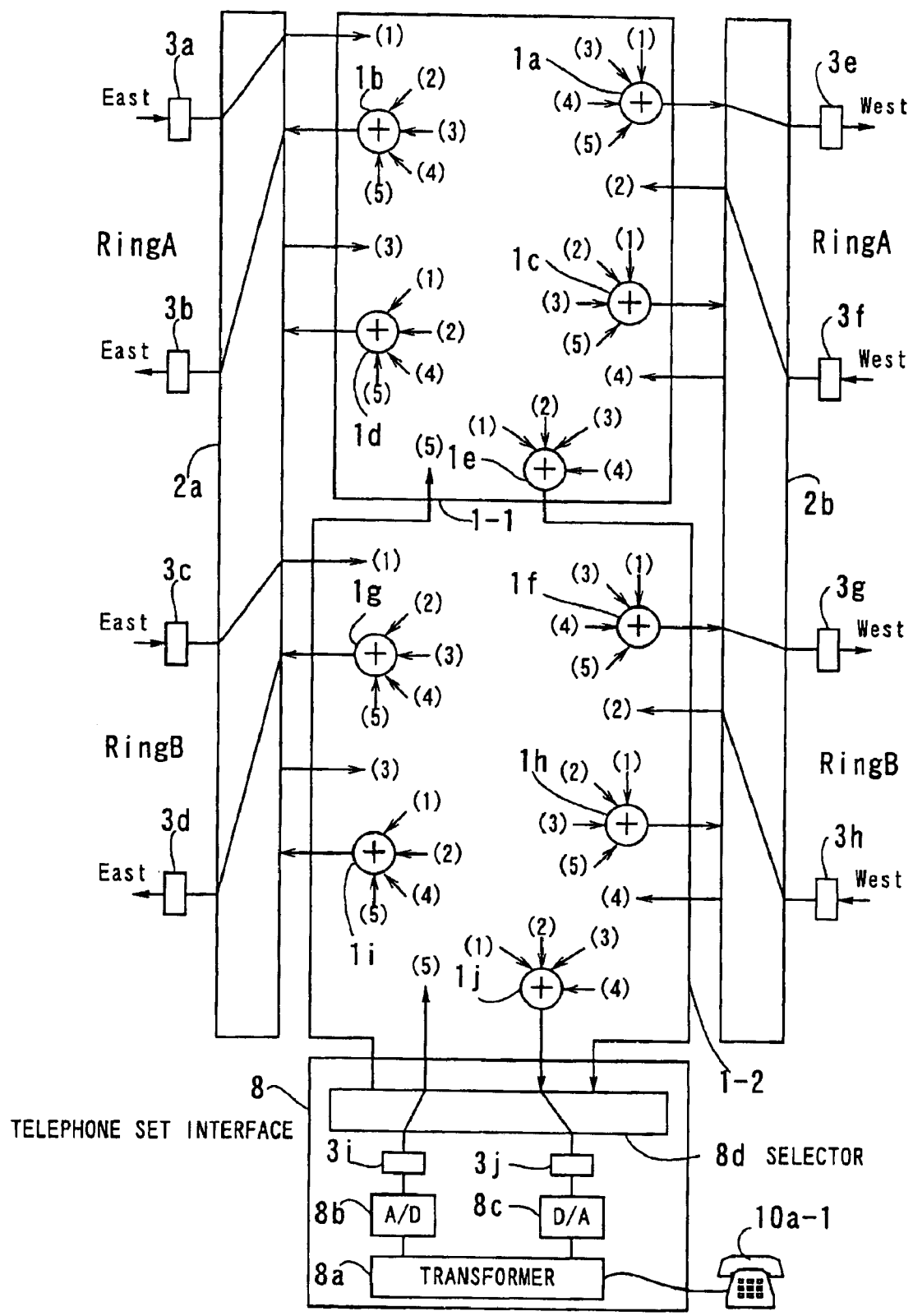
FIG. 5 is a diagram which shows the internal structure of a mixer and a telephone set interface.
Figure 6:
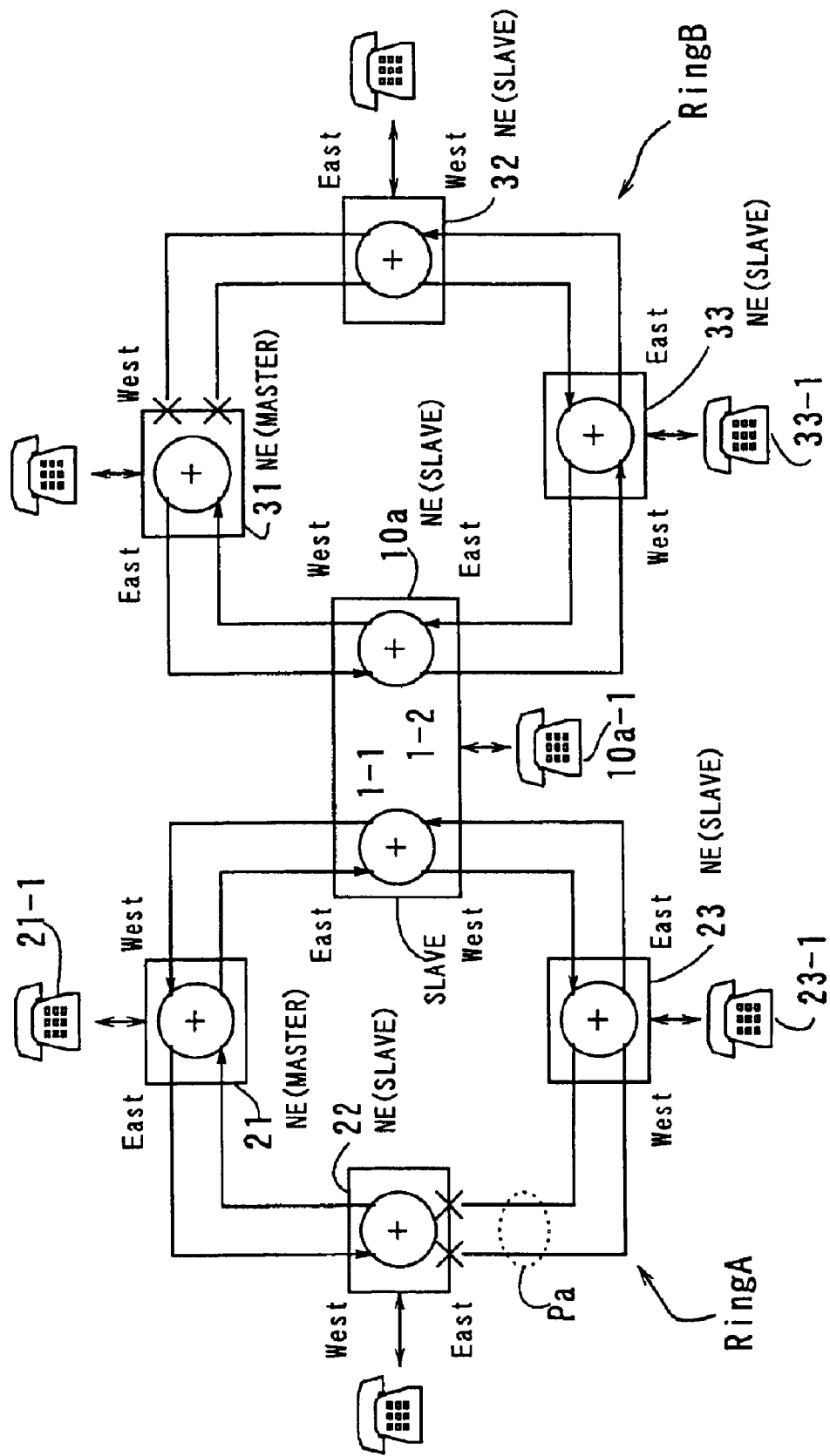
FIG. 6 is a diagram which shows how a two-ring system deals with a link failure.

FIG. 5 is a diagram showing the internal structure of the mixers 1-1 and 1-2 and the telephone set interface 8. The mixer 1-1 is composed of digital adders 1*a* to 1*e*. The mixer 1-2 is composed of digital adders 1*a* to 1*j*. Numerals in parentheses indicate the sources and destinations of orderwire signals. Signal (1), for example, is supplied from the matrix switch 2*a* and distributed to the digital adders 1*a*, 1*c*, 1*d*, and 1*e* in the mixer 1-1. Other signals (2) to (4) are distributed similarly.

The transmit voice signal produced in the telephone set 10*a*–1 is delivered to the ring B through the east and west ports of the NE 10*a*. The receive voice signals come in from the ring B through the east and west ports, which are supplied to the telephone set 10*a*-1 via a telephone set interface 8. This telephone set interface 8 comprises the following components: a transformer 8*a*, an A/D converter Bb, a D/A converter 8*c*, digital code converters 3*i* and 3*j*, and a selector 8*d*. The transformer 8*a* is a hybrid circuit which is used to convert from 2-wire interface to 4-wire interface and vice versa, besides supplying electric power. The A/D converter 8*b* receives an analog signal from the transformer 8*a* and converts it into digital form. The digital code converter 3*i* then converts that digital signal to a linear coded signal and sends it to the selector 8*d*. The selector 8*d* selects the destination of the signal, either the mixer 1-1 or the mixer 1-2.

The selector 8*d* also receives digital signals from the mixers 1-1 and 1-2. It selects either one of those signals and supplies the selected signal to the digital code converter 3*j*. The digital code converter 3*j* then converts the digital signal to an A-law coded or Mu-law coded signal and passes it to the D/A converter 8*c*. The D/A converter 8*c* converts the received digital signal into an analog signal, which is supplied to the transformer 8*a*.

When no link failure is assumed, the network system of FIG. 3 will operate as follows. In the illustrated situation, the orderwire circuit is closed within each ring. The NE 21 serves as the master station on the ring A, disabling the use of E1/E2 bytes at its west port to prevent howls from happening. Similarly, the NE 31 serves as the master station on the ring B, disabling the use of E1/E2 bytes at its west port. The NE 10a is configured not to allow the two rings A and B to exchange their orderwire signals; its internal matrix switches 2a and 2b provide straight connections between the ring A and the mixer 1-1, and between the ring B and the other mixer 1-2.

For illustrative purposes, a specific orderwire link between the NE 21 and NE 23 will be discussed below. It is also assumed that the ring A transports STM-4 frames; i.e., four STM-1frames #1 to #4 are time-division multiplexed. At the NE 21, the voice signal originating from the telephone set 21-1 is processed in the mixer of the NE 21 and then inserted to the E1#1 byte of ST-4 traffic. This orderwire signal reaches the NE 23 via the NE 22. The NE 23 terminates the E1#1 byte of each STM-4 frame and sends out the received orderwire signal to its local telephone set 23-1 through its internal mixer. In the opposite direction, the orderwire signal is sent from the NE 23 to the NE 21 via the NE 22, being carried on the E1#1 byte. The NE 21 terminates the E1#1 byte to extract an incoming orderwire signal. In this way, the orderwire communication is accomplished between the two NEs 21 and 23.

Now consider the orderwire link between the NE 10a and NE 33 on the ring B, assuming that the ring B transports STM-4 frames. At the NE 10a, the voice signal originating from the telephone set 10a-1 passes through the mixer 1-2 in the NE 10a and is then inserted to the E1#l byte of STM-4 traffic. This orderwire signal propagates over the ring B, finally reaching the destination NE 33. The NE 33 terminates the E1#1 byte of each STM-4 frame and sends out the received orderwire signal to its local telephone set 33-1 through the mixer. Similarly the orderwire signal is sent in the opposite direction, from the source NE 33 to the destination NE 10a. The NE 10a terminates the E1#1 byte to extract an incoming orderwire signal. In this way, the orderwire communication is accomplished between the two NEs 10a and 33.

While the normal operations of the system have been explained above, the following section will discuss the behavior in a fault situation. Suppose that the proposed two-ring system has encountered a link failure at the point Pa as indicated by the dotted circle in FIG. 6. This link failure causes the nearest NE 22 to alarm the master NE 21 of the ring A about the link failure. To resolve this problem situation, the master NE 21 triggers its ring restoration function, which enables the use of E1/E2 bytes at its own west port, as well as making the NE 22 terminate the orderwire circuit at the east port.

Now that the orderwire circuit has been restored, the voice signal originating from the telephone set 21-1 passes through the mixer in the NE 21 and then is inserted to, for example, the E1#1 byte of STM-4 frames. This orderwire signal propagates toward the NE 23 over the ring A. The NE 23 terminates the E1#1 byte of each STM-4 frame and sends the received orderwire signal to the telephone set 23-1 through its own internal mixer. Likewise, the voice signal originating from the NE 23 reaches the destination NE 21 via the NE 10a, tracking the same path in the reverse direction. In this way the orderwire communication channel between the two NEs 21 and 23 can be maintained, despite of the link failure. The same mechanism would work in the ring B; the explanation will not be repeated here.

Figure 7:
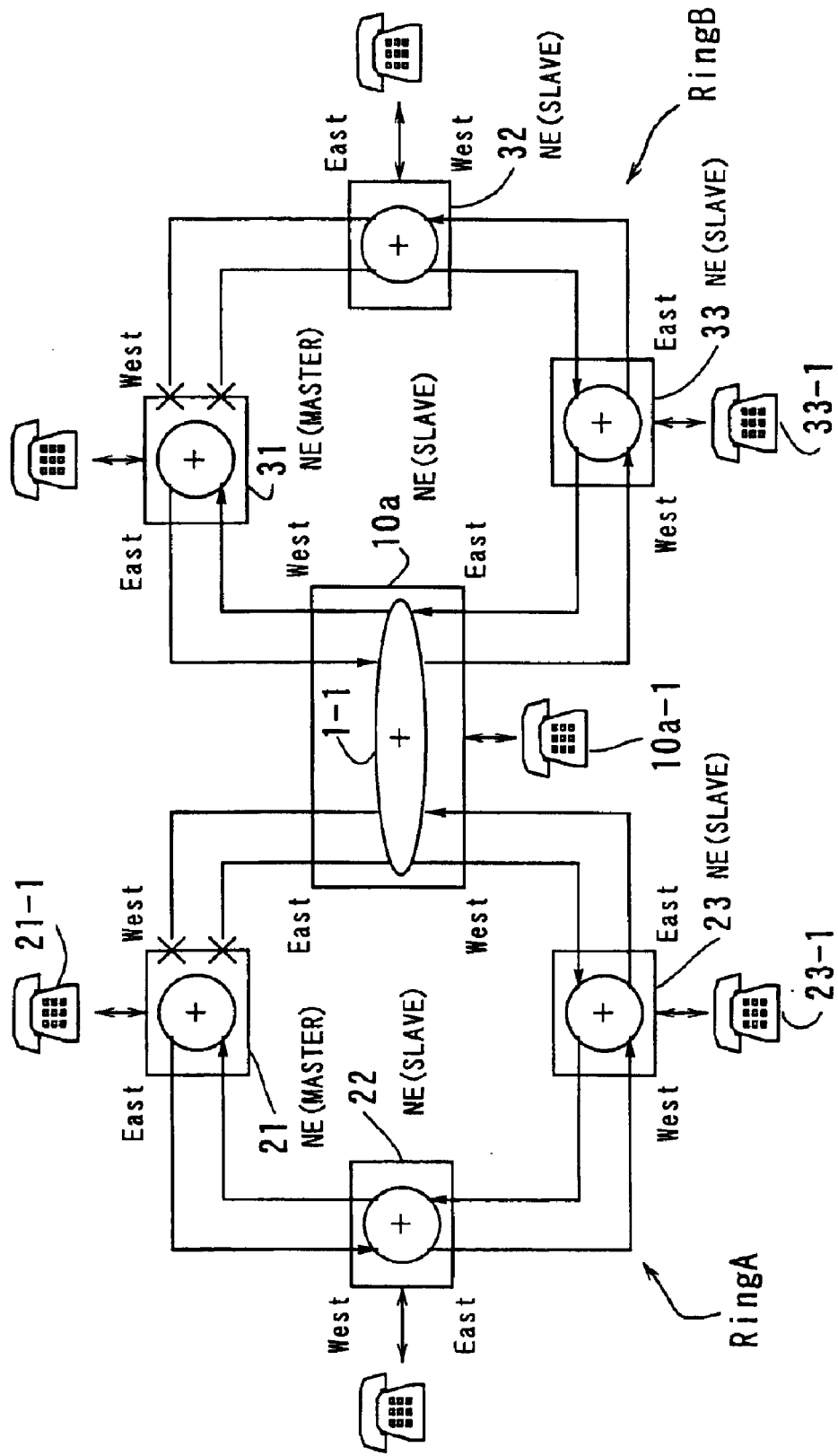
FIG. 7 is a diagram which shows a system configuration where two ring networks share their orderwire circuits.

Referring next to FIG. 7, the following section will describe how the rings A and B share the same orderwire circuit. For illustrative purposes, a particular group of nodes (NEs 21, 23, 10a and 33) will be considered.

In the system of FIG. 7, the NEs 21 and 31 serve as the master station on the rings A and B, respectively, disabling the use of E1/E2 bytes at their west port to prevent howls from happening. To enable the two rings A and B to exchange their orderwire signals, the NE 10a is configured so that the internal matrix switches 2a and 2b will connect both rings to the mixer 1-1. The signal of the telephone set 10a-1 is also directed to the mixer 1-1 via the selector 8d (FIG. 5).

The voice signal originating from the telephone set 21-1 is fed to a mixer in the NE 21 and inserted to, for example, the E1#1 byte of STM-4 frames. This orderwire signal reaches the NE 23 via the NE 22. Terminating the E1#1 of incoming STM-4 frames, the NE 23 supplies its local telephone set 23-1 with the received orderwire signal through the internal mixer. The NE 23 also forwards the orderwire signal to the next NE 10a through its east port, mixing with its local voice signal and inserting that data to the E1#1 byte of outgoing STM-4 frames.

The NE 10a receives the STM-4 frames at its west port, terminating their E1#1 byte. The received orderwire signal is supplied to the telephone set 10a–l through the mixer 1-1. The NE 10a also sends that orderwire signal to the NE 33 through its east port on the ring B, mixing with its local voice signal and inserting that data to the E1#1 byte of outgoing STM-4 frames. The NE 33 receives those STM-4 frames at its west port, terminating their E1#l byte. The received orderwire signal is supplied to the telephone set 33-1 through a mixer in the NE 33. In this way, the orderwire voice signals propagate from the NE 21 to the NE 33. The orderwire circuit also carries voice signals in the opposite direction (i.e., NE 33—>NE 10a—>NE 23—>NE 22) in a similar way, although it will not be explained here.

Figure 8:
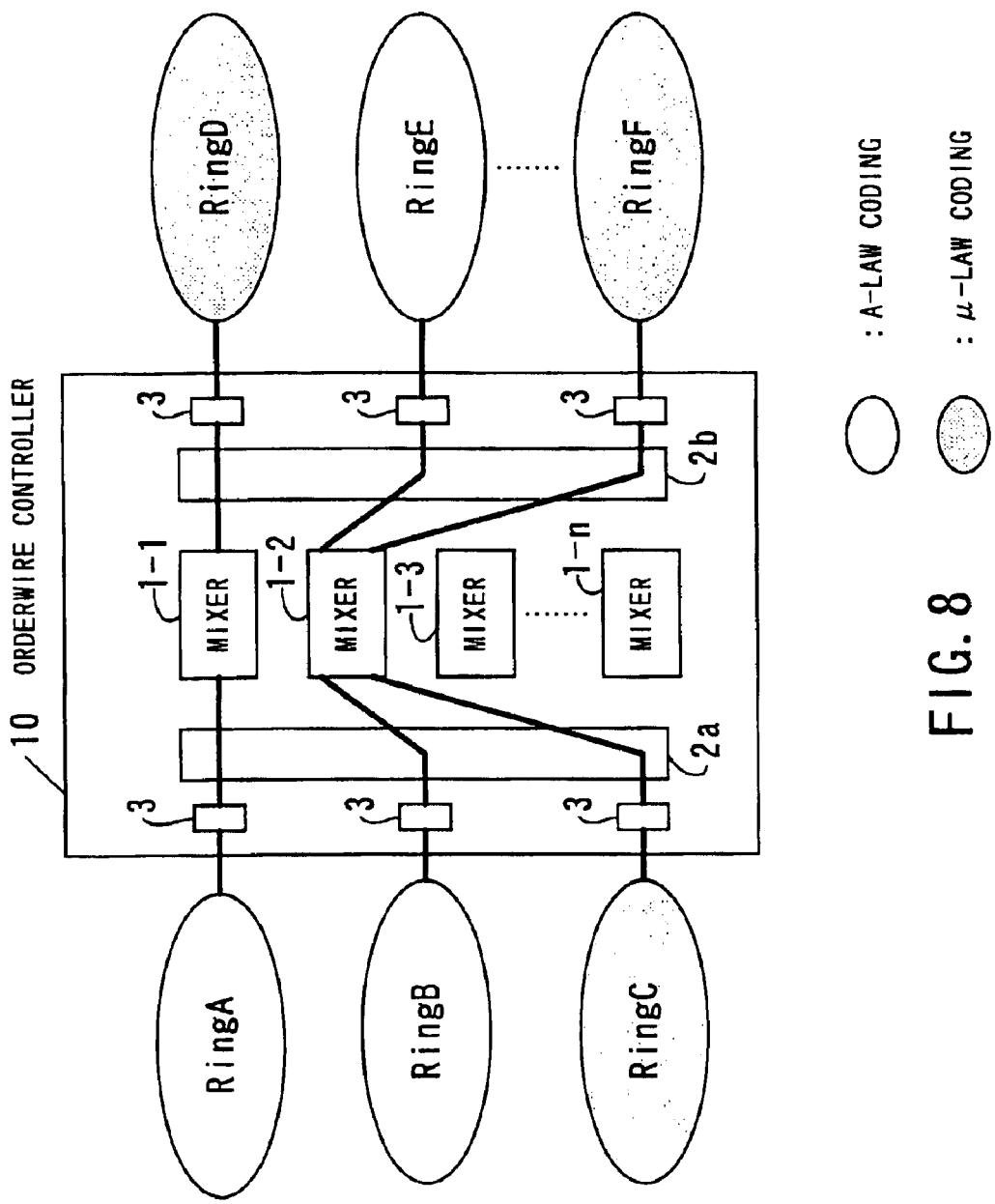
FIG. 8 is a diagram which shows a system where ring networks using A-law coding are linked with those using Mu-law coding.

Referring next to FIG. 8, the following section will now describe a system where ring networks using the A-law coding method are linked with other ring networks using the Mu-law coding method.

In the illustrated system, the mixer 1-1 serves the rings A and D, and the mixer 1-2 serves the rings B, C, E, and F, under the cross connection control of the matrix switches 2a and 2b. With this setup, the two rings A and D share a common domain of orderwire signaling, as do the other rings B, C, E, and F. Note that the rings A, B, and E use A-law coding, while the rings C, D, F use Mu-law coding. The digital code converters 3 convert A-law or Mu-law coded orderwire signals into linear coded signals before supplying them to the mixers 1-1 to 1-n. This signal conversion permits the mixers 1-1 and 1-2 to perform digital summation directly, assuming that all the input signals are linear coded. It is therefore possible for the NEs on different rings to communicate with each other, no matter which coding method they actually use, A-law or Mu-law.

Figure 9:
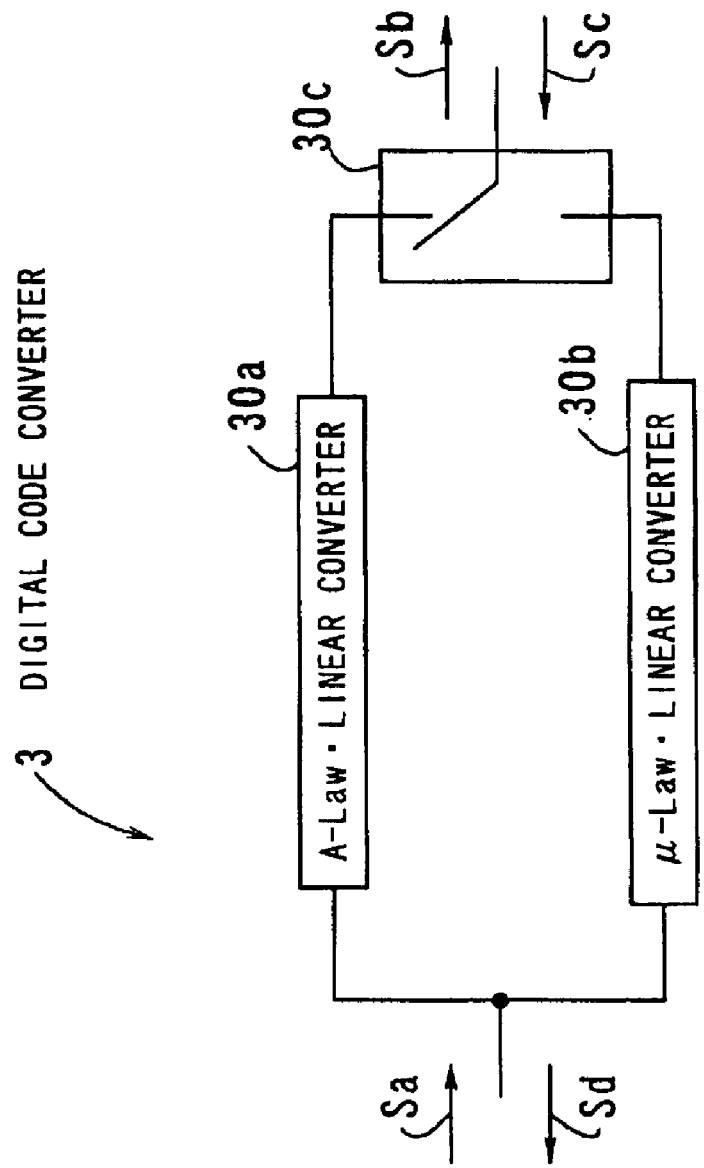
FIG. 9 is a diagram which shows a configuration of a digital code converter.
Figure 10:
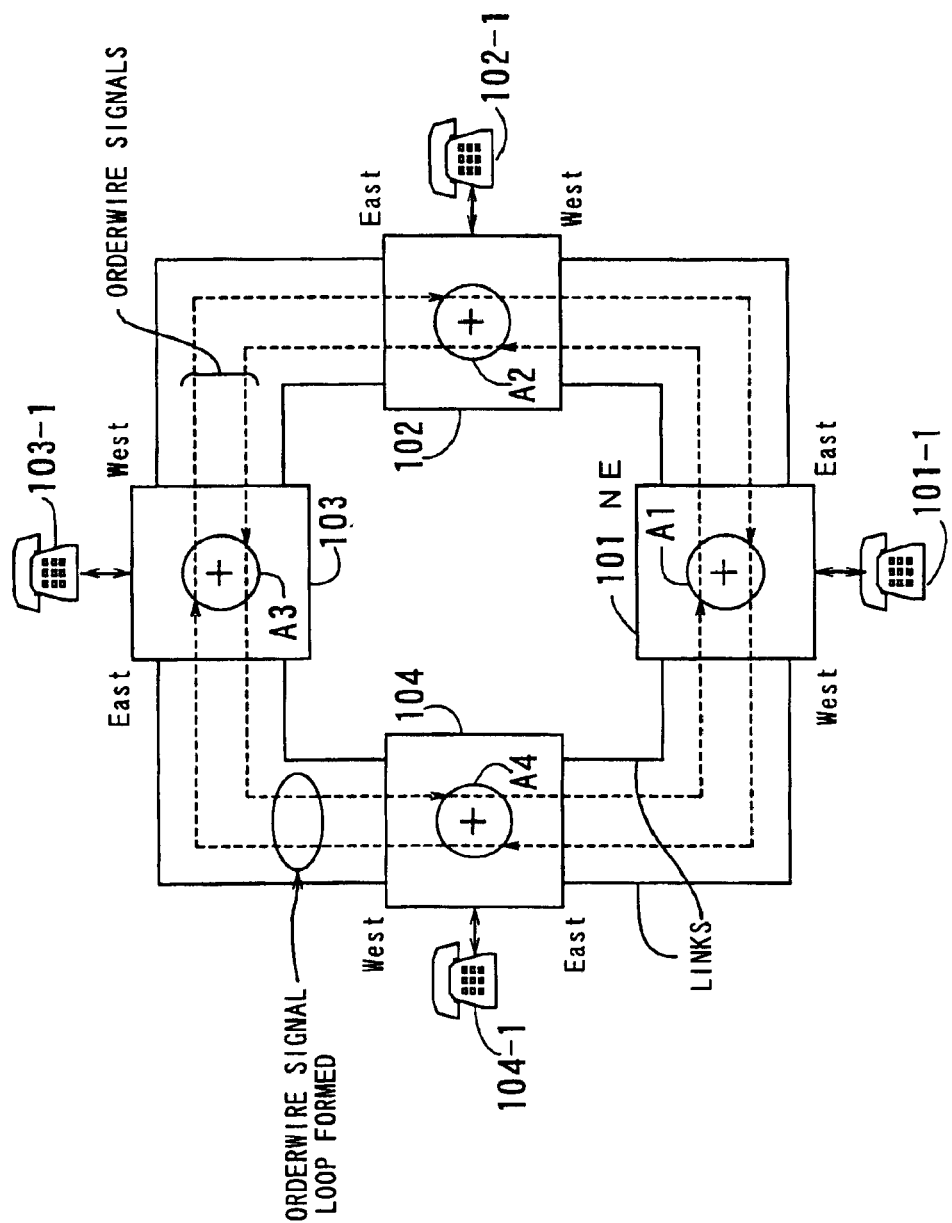
FIGS. 10 and 11 are diagrams which show the concept of ring protection functions.
Figure 11:
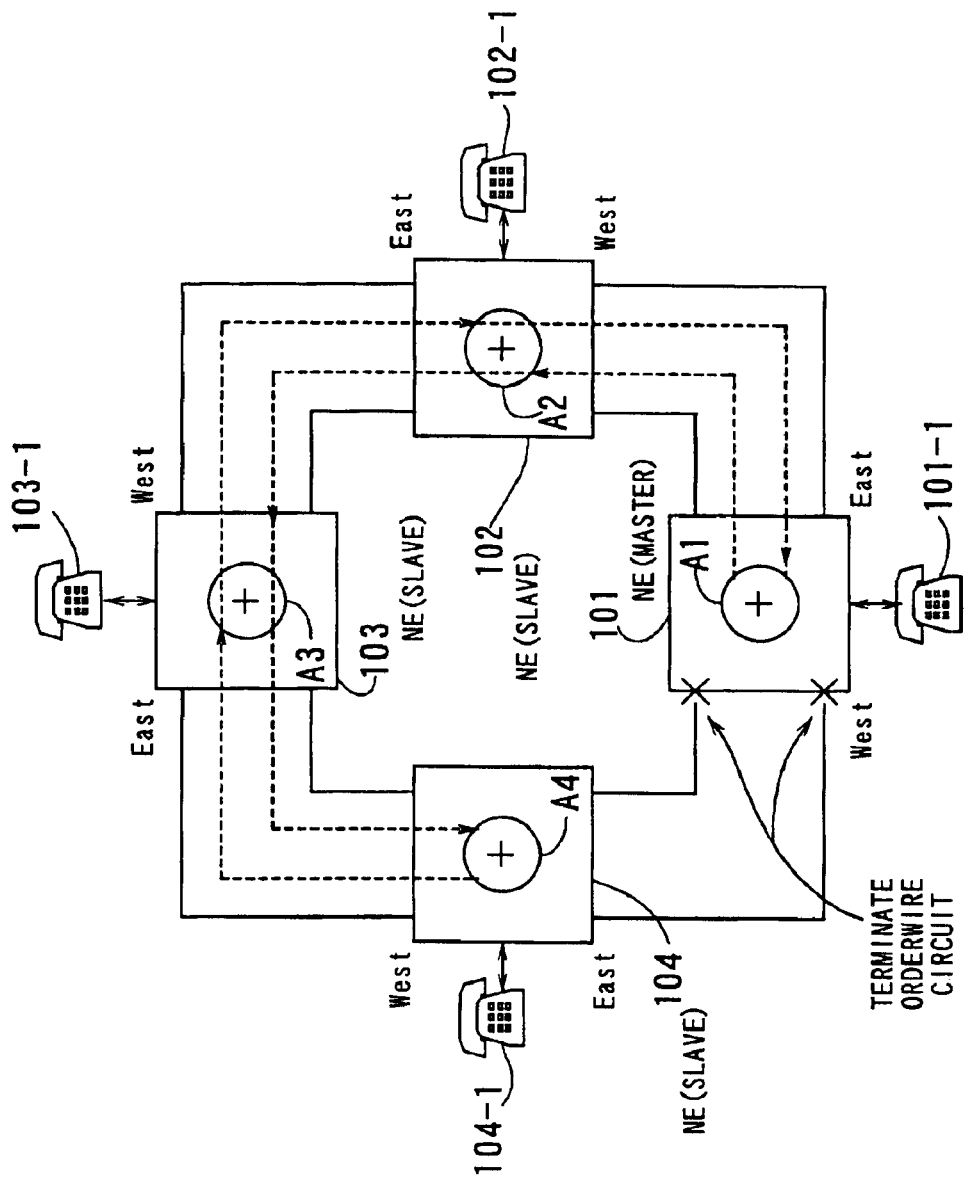
Figure 12:
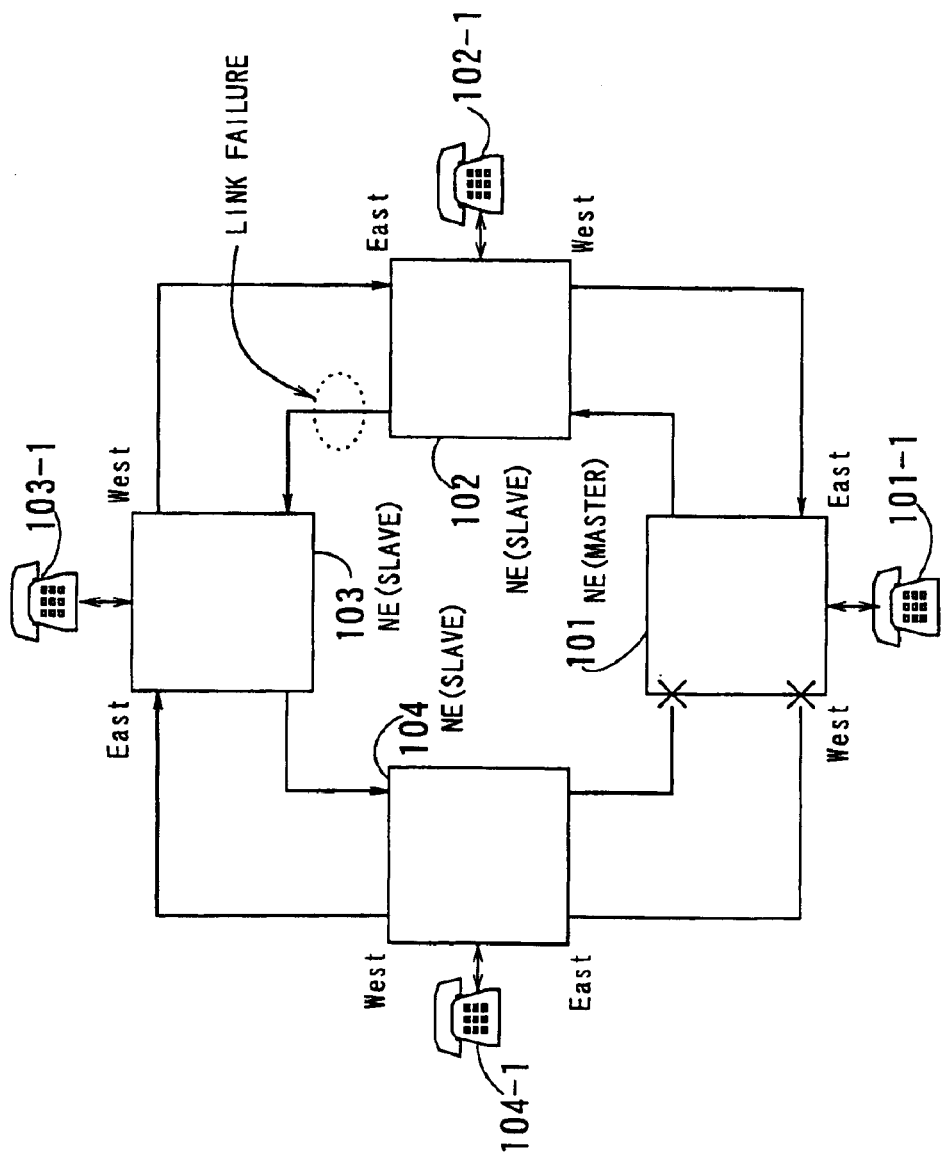
FIGS. 12 and 13 are diagrams which show the concept of ring restoration functions.
Figure 13:
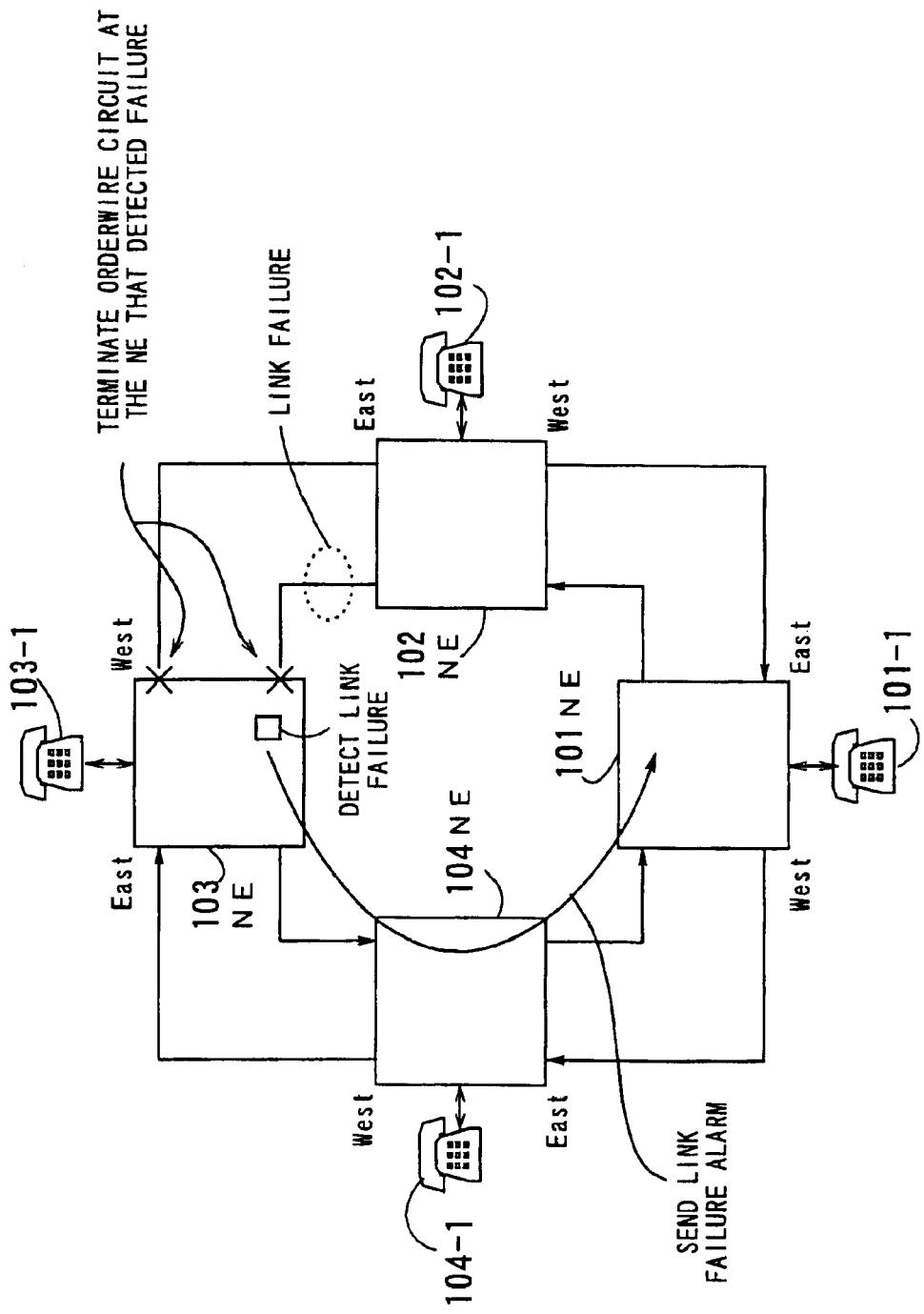
Figure 14:
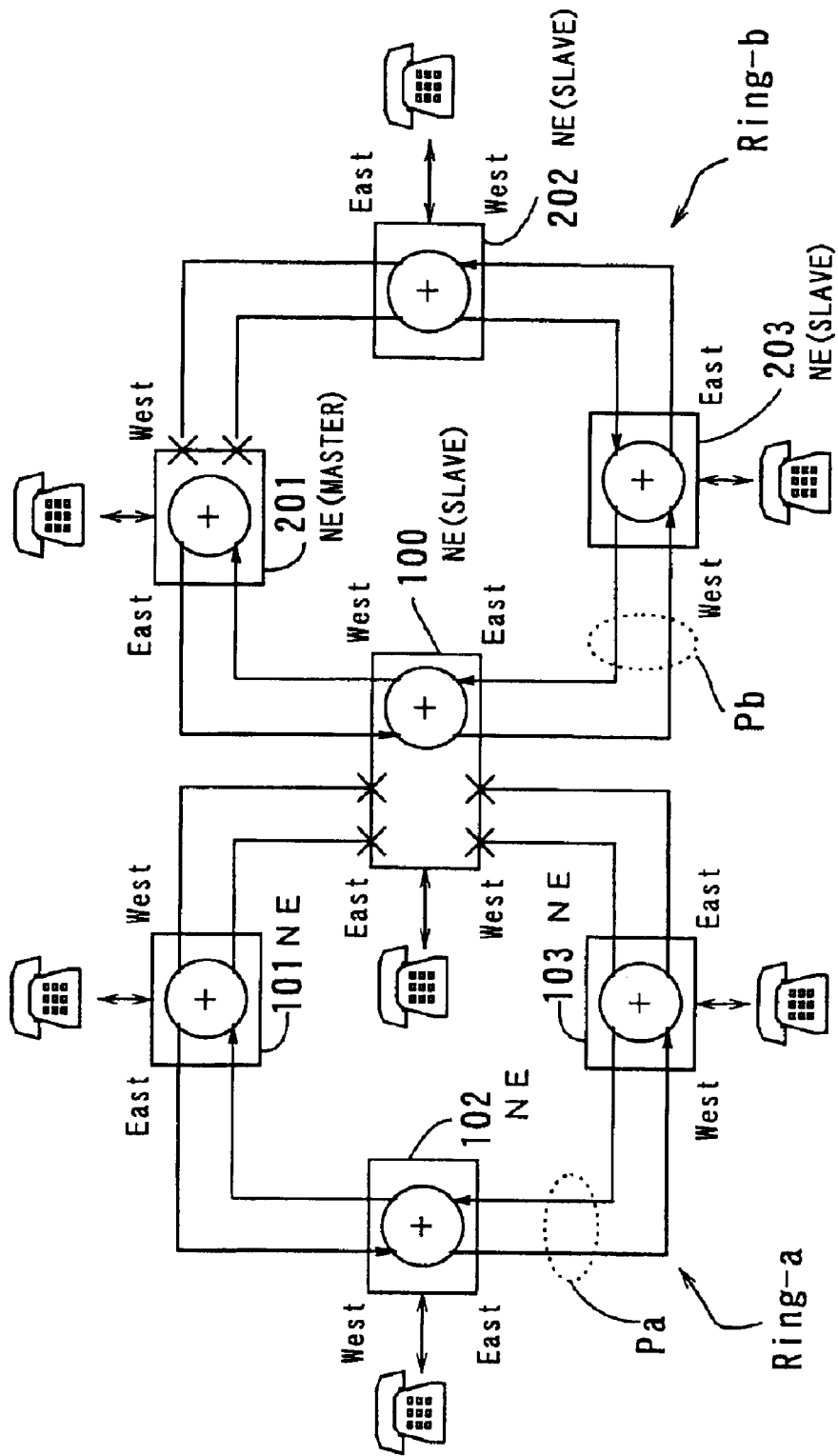
FIG. 14 is a diagram which shows a system where two ring networks meet at a junction node.

FIG. 9 shows the structure of the digital code converter 3. The digital code converter 3 comprises an Alaw/linear converter 30a, a Mu-law/linear converter 30b, and a switch 30c. The A-law/linear converter 30a converts A-law coded signals into linear coded signals and vice versa. Likewise, the Mu-law/linear converter 30b converts Mu-law coded signals into linear coded signals and vice versa. The switch 30c selects either one of the A-law/linear converter 30a and Mu-law/linear converter 30b on demand.

The above conversion mechanism is used as follows. When an A-law coded signal Sa is given, the switch 30c selects the output of the A-law/linear converter 31, thereby providing a linear coded signal Sb. When a linear coded signal Sc is given, and an A-law coded output is needed, the switch 30c chooses the A-law/linear converter 30a. The A-law/linear converter 30a then converts the given signal Sc to an A-law coded signal Sd. In this way, the digital code converter 3 converts an A-law or Mu-law coded orderwire signal into a linear coded signal, or vise versa. This enables the orderwire facilities to function correctly even when the network system involves both A-law based rings (SDH) and Mu-law based rings (SONET).

The above discussion will now be summarized as follows. According to the present invention, the orderwire controller 10 comprises a plurality of mixers 1-1 to 1-n which add up orderwire signals together, and a combination controller 2 which controls the combinations of the orderwire signals to be mixed by providing appropriate cross connections. In multi-ring network systems, the proposed orderwire controller 10 enables each ring to have a fully functional orderwire circuit that is tolerant to link failures, thus providing improved usability and maintainability. Further, according to the present invention, the mixers 1-1 to 1-n are implemented with digital adders, which can be integrated into a small chip at lower costs. Because of their high noise immunity, the digital mixers can provide more channels for simultaneous orderwire communication.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An orderwire controller which controls orderwire circuits to provide maintenance people with voice communication facilities, comprising:
    a plurality of mixing means, disposed in a junction node at which a plurality of ring networks meet, each for mixing orderwire signals of a specified group of ring networks; and
    combination control means, disposed in the junction node, for directing each of said plurality of mixing means as to which ring networks should form a group for sharing orderwire functions thereof.

2. The orderwire controller according to claim 1, further comprising digital code conversion means for performing signal conversion between an A-law coded or Mu-law coded orderwire signal and a linear coded digital voice signal.

3. The orderwire controller according to claim 1, wherein said plurality of mixing means add up the orderwire signals in a digital fashion.

4. The orderwire controller according to claim 1, wherein said plurality of mixing means mix the orderwire signals sent from network elements in at least one ring network.

5. An orderwire control system which controls orderwire circuits to provide maintenance people with voice communication facilities, comprising:
    (a) a plurality of ring networks in which a plurality of nodes are interconnected in a ring topology; and
    (b) an orderwire controller disposed in a junction node at which a plurality of ring networks meet, comprising:
    a plurality of mixing means each for mixing orderwire signals, of a specified group of ring networks, and
    combination control means directing each of said plurality of mixing means as to which ring networks should form a group for sharing orderwire functions thereof.

\* \* \* \* \*